Dec. 30, 1952   R. F. FAUSER   2,623,763
JOINT FOR ELECTRICAL FITTINGS
Filed June 15, 1949

INVENTOR.
Richard F. Fauser
BY
Parker, Prochnow & Farmer
Attorneys.

Patented Dec. 30, 1952

2,623,763

UNITED STATES PATENT OFFICE 2,623,763

JOINT FOR ELECTRICAL FITTINGS

Richard F. Fauser, Kenmore, N. Y.

Application June 15, 1949, Serial No. 99,168

2 Claims. (Cl. 285—95)

This invention relates to improvements in joints of the universal type which are used in connection with electrical fixtures or fittings for permitting limited universal movement of one part relatively to another.

One of the objects of this invention is to provide a connection of this type of improved and simplified construction and which limits the movement of the parts relatively to each other to avoid damage by excessive twisting to electrical conductors passing through the joint or connection.

Another object is to provide a device of this type of simple and inexpensive construction which may readily be manufactured in quantities and which comprises the minimum number of parts.

A further object is to provide a ball and socket connection between a relatively fixed conduit and an electrical device and in which an angular member is employed which permits movement of the ball into various positions about the axis of the socket member and limits the turning of the ball and socket relatively to each other about their axis.

Other objects and advantages will be apparent from the following description of one embodiment of the invention and the novel features will be particularly pointed out hereinafter in connection with the appended claims.

Figure 1:
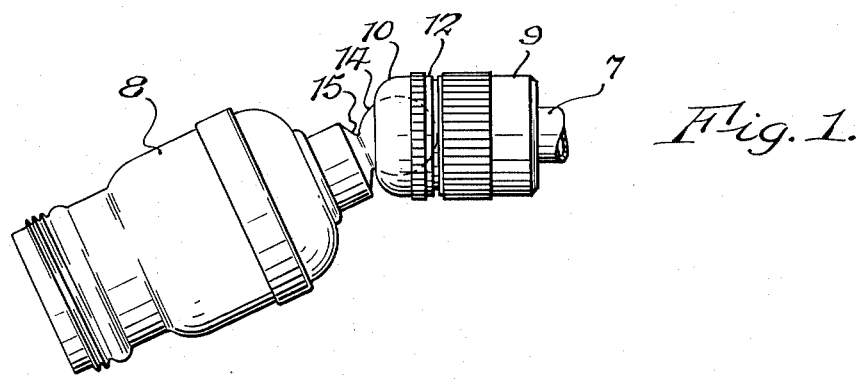
Fig. 1 is a side elevation of a limited universal joint or connection embodying this invention between two parts carrying electrical conductors.

In the drawings I have illustrated my universal connection as used for mounting an electric light socket on a conduit to permit limited, universal movement of the light socket relatively to the conduit. It will be understood, however, that my improved connection may be employed for connecting other parts carrying electrical connectors.

In the drawings, 7 represents a conduit or tube for electrical conductors and 8 represents an electric light socket to which the ends of the conductors may be secured for supplying current to a light or other device connected with the socket. My improved connection comprises a housing including two connected hollow housing parts 9 and 10. In the particular construction shown, the housing part 9 is in the form of a hollow sleeve having a threaded or other connection with the conduit 7. The two housing parts may be secured together in any suitable or desired manner, and as shown, the housing part 9 is provided with an externally threaded portion 11 which engages an internally threaded flange 12 of the housing part 10. The outer end of the housing part 10 is constructed to form a socket for a ball 14 so that the ball may be moved to a limited extent relatively to the housing. The ball is provided with an extension or neck portion 15 which may be connected in any suitable or desired manner with the socket 8 or other electrical part to be connected with the joint shown. The ball and extension 15 are provided with a central, axially extending bore or aperture 16 through which electrical conductors may pass.

Ball and socket or swivel connections for electrical fixtures with a ball and socket have heretofore been used in connection with electrical appliances for the purpose of enabling the socket or other device mounted on the ball to move into various angular relations to the relatively stationary part, such as the conduit 7, in which the axis of the socket may be moved into various angular relations to the axis of the conduit or joint housing. Swivel connections of this type, however, have not been considered entirely safe for the reason that it has been possible, in addition to moving the socket into various angular relations to the conduit 7, to also turn the socket 8 about its axis. This is frequently done when a lamp shade or the like is mounted on a socket and it is desired to turn it to direct the light in different directions. Limited turning of the lamp socket about its axis will do no harm, but if the light socket is turned a number of times in the same directions, the conductors within the conduit, swivel connection and lamp socket will become twisted so that the insulation may be broken, thus causing short circuits or grounding the conductors, which may be a serious hazard. In order to overcome this objection, I have provided the following construction:

The portion of the ball which is arranged within the housing of the swivel or universal joint is provided with a relatively wide slot or depression 18 extending crosswise of the axis of the aperture 16 in the ball, and another relatively wide slot 19 is provided within the housing. In the construction illustrated for this purpose, this slot 19, which also extends diametrically with reference to the axis of the housing of the joint, is cut through the externally threaded end portion 11 of the housing member or sleeve 9.

21 is an annular member shaped to be arranged within the housing of the swivel or universal joint and having one or more inwardly extending projections 22, two such projections being shown in the construction illustrated. These projections extend into the transverse slot 18 of the ball 14. The projections 22 are relatively narrow as compared with the slot 18 and, consequently the ball 14 may be turned about its axis to a limited extent before contacting with the projection or projections 22 of the annular member 21. Movement of the annular member with reference to the housing is limited by means of one or more outwardly extending projections 24 which enter into the slot 19 in the housing, two such projections being shown in the construction illustrated. Preferably, the outwardly extending projections 24 are also relatively narrow compared with the width of the slot 19, so that the annular member 21 may move to a limited extent relatively to the housing about the axis of the same before the projections 24 contact the edges of the slot 19.

Figures 2, 3:
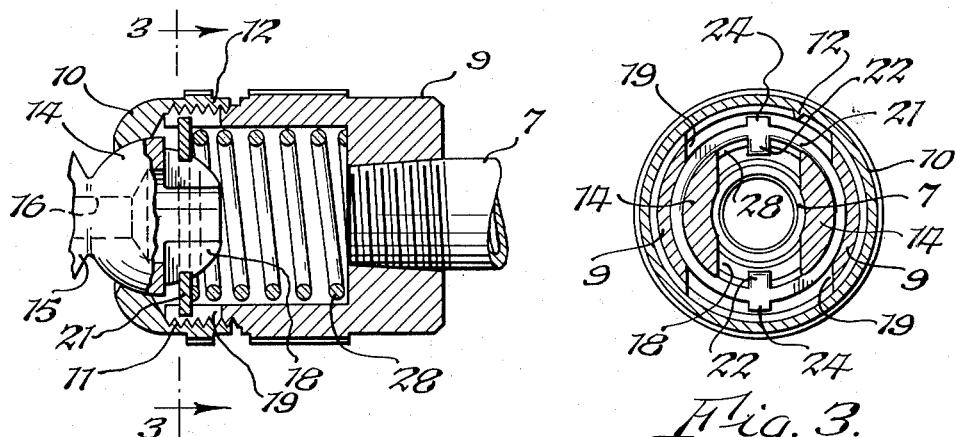
Fig. 2 is a fragmentary, longitudinal, central, sectional view thereof on an enlarged scale.
Fig. 3 is a transverse sectional elevation thereof on line 3—3, Fig. 2.
Figures 4, 5:
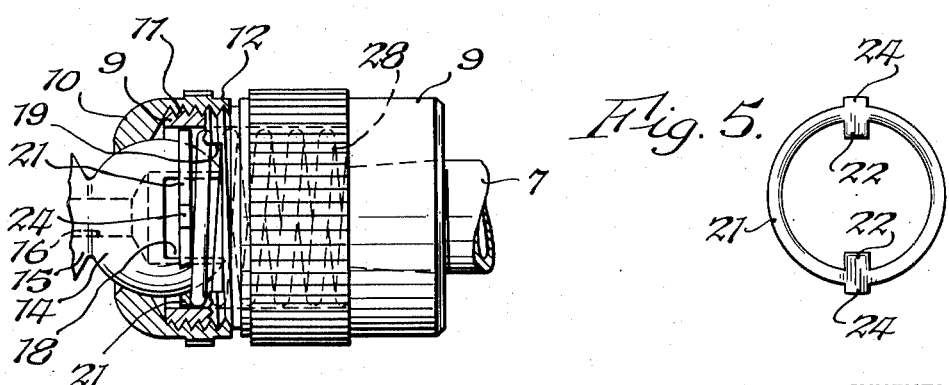
Fig. 4 is an elevation thereof, partly in section, taken at about 90° from Fig. 2.
Fig. 5 is a detached view of an annular connecting member between the parts of the universal connection for limiting the movement of the parts relatively to each other about their common axis.

The annular member 21 may be held in operative relation to the ball in any suitable or desired manner and, in the construction shown for this purpose, a spiral spring 28 is provided, one end of which bears against the annular member 21 and the other end of which bears against the end of the cavity or recess within the housing. The inner periphery of the annular member 21 is such that this member will be pressed by the spring against the spherical surface of the ball 14. Since this annular member seats against the ball, it is desirable to bevel or round off the inner edge of the annular member, as shown in Figs. 2, 4 and 5, so that the annular member will not cut the ball when the ball is rotated relatively to the annular member.

In the operation of the universal joint, the ball member together with the socket 8 or other part secured thereto, may be swung into any desired positions in which the axis of the ball and its extension 15 are arranged at an angle to the axis of the housing of the joint, the only limit to the swinging being the engagement of the neck portion or extension 15 of the ball with the edge of the socket portion of the housing member 10. The annular member 21 does not interfere with the swinging in this manner of the ball, since this member is yieldingly held by the spring 28 and may be moved into inclined positions within the housing. The construction described therefore provides ample freedom of adjustment of the ball into angular relation to the housing of the swivel connection. However, the construction described limits the extent to which the ball and the light socket 8 may be turned on their axis relatively to the housing, and this turning of the ball is limited. However, the ball can be turned to a limited extent relatively to the annular member 21 because of the fact that the slot 18 in the ball is much wider than the inwardly extending projection 22. When an edge of the slot 18 of the ball engages an inwardly extending projection 22, the ball may be turned still further by partial rotation of the annular member 21 relatively to the housing to the extent permitted by the width of the slot 19 of the housing. This amount of rotation of the ball relatively to the housing about the axis of the ball is not sufficient to injure the electrical conductors passing through the swivel connection.

The construction described has the advantage that in order to render the swivel connection safe against damage to conductors, it is only necessary to provide the slots in the ball and in the housing, and to provide an annular member which may be made of a sheet metal stamping and a spring for holding the annular member in its operative position. The spring also serves the function of pressing the ball against the socket so as to frictionally hold the ball in any position to which it is set.

While I have shown the ball provided with a slot 18 which extends completely through the same, this is done merely to facilitate manufacture of the same, since it will be obvious that slots may be formed in the periphery of the ball without extending through the same, providing the slots are of sufficient depth to receive the inwardly extending projections 22 of the annular member. Similarly the slots 19 need not extend completely through the threaded portion of the housing member 9.

It will be understood that various changes in the details and arrangements of parts, which have been hereindescribed and illustrated in order to explain the nature of the invention, may be made by those skilled in the art within the principle and scope of the invention as expressed in the appended claims.

I claim:

1. A universal joint comprising a housing including two hollow housing parts secured together and through which electrical conductors may pass, one of said housing parts being formed to constitute a socket, a ball within said housing and seated in said socket and having a neck part extending outwardly beyond said socket, said ball having a passage through the same and through said neck part through which electrical conductors may pass, said ball having a relatively wide transversely extending slot in the inner portion thereof, said housing having a slot in the wall thereof adjacent to said ball, and an annular member within said housing having an inwardly extending projection which is relatively narrow compared with the slot in said ball and which extends into said ball slot to permit limited turning of said ball relatively to said annular member, said annular member also having an outwardly extending projection entering said slot in said housing, and including a spring within said housing bearing against said annular member and urging the same into contact with said ball.

2. A universal joint for attachment to a conduit for electrical conductors including a partly spherical ball member having a neck portion to which an electrical appliance may be secured and having a central passage within said ball member and neck portion through which electrical conductors may pass to said appliance, said ball member having a slot extending crosswise of said passage in the portion thereof opposite to said neck, a socket member extending about a portion of said ball and having an internally threaded flange, an externally threaded hollow sleeve secured to said conduit and which is formed for engagement with the internally threaded portion of said socket member to form a housing and which has a relatively wide slot extending across the same, an annular member arranged within said sleeve and having inwardly extending parts formed to enter into said slot of said ball and of less width than said slot to permit limited turning movement of said ball relatively to said annular member, an outwardly extending part on said annular member and extending into said slot in said externally threaded sleeve, and spring means within said housing urging said annular member against said ball and holding said annular member in operative relation to said ball and housing.

RICHARD F. FAUSER.

REFERENCES CITED

The following references are of record in the file of this patent:

UNITED STATES PATENTS

| Number | Name | Date |
| --- | --- | --- |
| 356,614 | Bunnell | Jan. 25, 1887 |
| 916,301 | Greenlaw | Mar. 23, 1909 |